No. 860,363. PATENTED JULY 16, 1907.
J. H. FORREST.
VEHICLE WHEEL.
APPLICATION FILED JUNE 1, 1906.
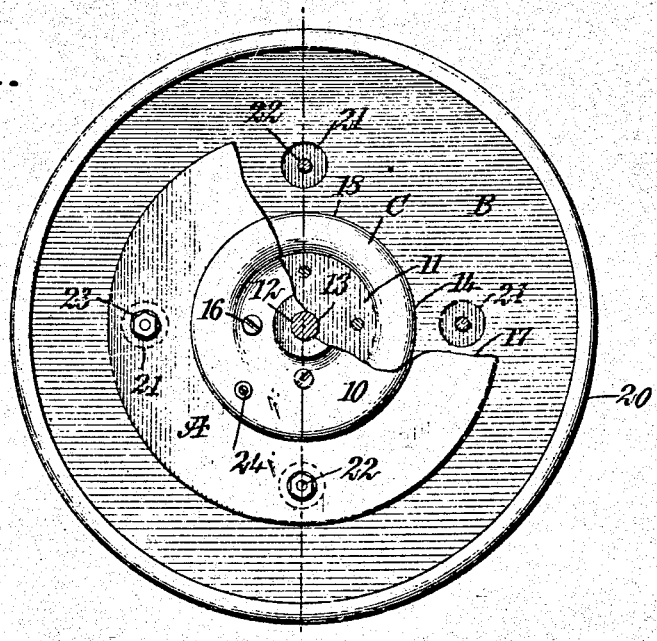
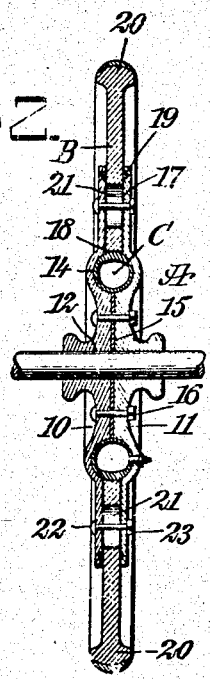
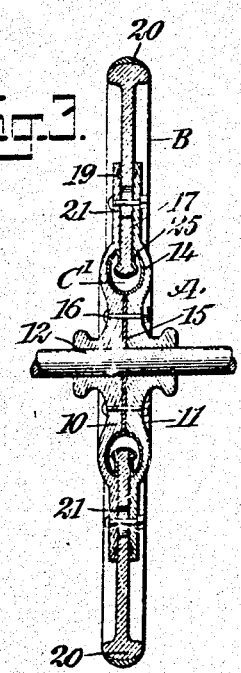
INVENTOR
John H. Forrest
BY Munn & Co.
ATTORNEYS

UNITED STATES PATENT OFFICE.

JOHN HORACE FORREST, OF MARION, INDIANA, ASSIGNOR OF ONE-HALF TO MATTIE D. FORREST, OF MARION, INDIANA.

VEHICLE-WHEEL.

No. 860,363.　　　Specification of Letters Patent.　　　Patented July 16, 1907.

Application filed June 1, 1906. Serial No. 319,719.

*To all whom it may concern:*

Be it known that I, JOHN HORACE FORREST, a citizen of the United States, and a resident of Marion, in the county of Grant and State of Indiana, have invented a new and useful Improvement in Vehicle-Wheels, of which the following is a full, clear, and exact description.

The purpose of the invention is to provide a pneumatic or cushioned vehicle wheel, especially designed for automobiles but which is equally serviceable wherever a supporting or traction wheel is needed, and to so support the wheel that it will be simple, durable and economic and so that the pneumatic tube, or other cushion employed, will be removed from the tread of the wheel and thoroughly protected against outside interference.

A further purpose of the invention is to provide a wheel of the character described which may be provided with a metal or solid tire, covered or uncovered with yielding material, and which will be as buoyant if not more so than when the ordinary pneumatic tire is employed, and wherein at the same time the cushion cannot be punctured.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the improved wheel, parts being broken away; Fig. 2 is a central section through the wheel; and Fig. 3 is a central section through a slightly modified form of the wheel.

The wheel comprises practically a hub section A, a body section B and an interposed cushion C. The hub section A consists of opposing disk members 10 and 11 suitably bored and exteriorly enlarged and finished at their central portions to produce bearings 12 for the axle 13.

Between the bearings 12 of the hub section and the periphery of the members 10 and 11, registering endless grooves are provided in the inner face of the members, so that when said members 10 and 11 are brought together a circular chamber 14 is formed for the reception of the aforesaid cushion C, which cushion is by preference in the form of a pneumatic rubber ring; but it may be solid and under some conditions the latter construction may prove the most serviceable and effective. Between the bearings 12 and the chamber 14 the inner faces of the members 10 and 11 are flat, as is shown at 15 in Figs. 2 and 3, and at such points the members 10 and 11 are strongly connected by bolts or rivets 16.

The members 10 and 11 of the hub section A are so reduced in thickness and are so constructed between their peripheries and the chamber 14 as to provide an annular space 17 the inner walls whereof are straight and smooth. The annular space 17 communicates with the annular chamber 14 and receives the body section B of the wheel. The said body section B has a central circular opening 18 of sufficient diameter to permit the wall of the opening to bear or rest upon the exposed exterior surface of the cushion C, as is shown in Fig. 2, and while the body B fits quite snugly in the annular peripheral space 17 of the hub section A, the hub section has more or less play upon the body section to bring the cushion under the desired expansion and contraction during the travel of the wheel.

Opposing grooves 19 are made in the inner faces of the hub section A, adapted for the reception of a hydraulic or other packing, so as to render the connection between the sections A and B dust and water proof. The body section B extends as far as may be desired beyond the hub section A and is provided at its outer edge with a tire 20, which may be integral with the body section or attached thereto, and said tire may be constructed of metal or of wood, or of a composition, as may likewise be the entire wheel, and the tire if found desirable may be covered with a soft or yielding material.

A series of circular openings 21 is provided in that portion of the body section B contained between the members 10 and 11 and the hub section A. The openings 21 are radially arranged and may be of any required number, four being usually deemed sufficient. The openings are also preferably an equal distance apart. Connecting bolts 22 are passed through the hub members 10 and 11 and through the openings 21 in the body section B, which bolts act as roller bearings and are therefore termed roller bolts. The bolts 22 are provided with nuts 23, and the said nuts are tightened sufficiently to draw the hub members together, but without pinching the body section B. One of the members of the hub section A is provided with an aperture through which the valve 24 for the cushion extends when said cushion is pneumatic.

When the wheel is at rest with the tube or cushion C fully inflated, the bolts 22 are near the centers of the openings 21, but when the wheel is in motion they move toward the walls of the said opening. The pneumatic tube C takes up the burden of the jar, but in the event the friction of the tube is insufficient to stand the strain the said roller bolts will travel around the said openings 21 in said body section B. The pneumatic tube C is heavily reinforced at the point where it engages with the body section B.

I desire it to be understood that I do not restrict myself to any particular material in the construction of the wheel, and that any desired form of tire may be employed in connection with the wheel.

In the construction shown in Fig. 3, the body section B is provided with a flange integral with the wall of the central circular opening 18, the said flange being endless; and the flanged portion of the body section extends into the chamber 14, in which chamber a pneumatic or a solid elastic cushion C' is located, having an exterior channel 25 in that portion of its periphery which faces the annular opening 17 between the members of the hub section at its peripheral portion. The said channel extends usually to about the central portion of the cushion or tube where it is somewhat enlarged to receive the aforesaid flange 25. The pressure on the tube C' is sufficient to cause the said tube to so grip the body section that it will hold it against any pull.

With relation to the pneumatic tubes C and C', they may be cemented in their receivers or the receivers may be corrugated, and the tubes correspondingly shaped to fit the corrugations; spring metal or other material may be used in connection with the tubes to assist in holding them in the required position.

Having thus described my invention, I claim as new, and desire to secure by Letters Patent,—

1. A vehicle wheel, comprising a hub section formed of two opposing members having a central bearing for an axle, and opposing grooves in their inner faces, forming an annular chamber, the portions of the members beyond the chamber being spaced apart to form an annular space, a pneumatic tube in the annular chamber and having an exterior channel, and a body section having a central opening and arranged in the space between the members of the hub section with the wall of its opening extending into the groove of the tube, said body section being provided with openings in that portion which is between the members of the hub section, and bolts secured in the members of the hub section and passing through the openings of the body section, said openings being of greater diameter than the bolts.

2. In vehicle wheels, a hub section formed of opposing members having a bearing produced therein for an axle, grooves on their inner faces forming an annular chamber surrounding said bearing, and an annular interior space at its peripheral portion connecting with said chamber, a pneumatic tube fitted in said chamber, a body section which enters the said annular space in the hub section to a continuous bearing on the said pneumatic tube, the said body section being provided with a series of circular openings at that portion which enters the hub section, and roller bolts carried by the said hub section and passed through the openings in the body section, the openings in the body section being of greater diameter than the diameter of the said bolts.

3. In a vehicle wheel, a hub section constructed of two opposing members having bearings produced therein for an axle, and means for securing the members together around the said bearings, said sections having their inner faces grooved to provide an annular chamber and said sections likewise having their peripheral portions separated to provide an annular space connecting with said chamber, a pneumatic tube located in said chamber, a body section adapted to carry a tire, which body section is provided with a central opening and is received in the said annular space between the members of the hub section, the wall of the central opening engaging with the exposed portion of the said tube, the said body section being likewise provided with a series of circular openings produced in that portion which is between the members of the hub, and roller bolts secured to the said hub section, which bolts are passed through the circular openings in the body section, the latter openings being of greater diameter than the diameter of the bolts.

In testimony whereof I have signed my name to this specification in the presence of two subscribing witnesses:

JOHN HORACE FORREST.

Witnesses:
HARRY M. HAM,
JOHN R. HADLEY.